Sept. 4, 1928.
B. F. COLVIN
1,683,240
CHILD'S VEHICLE
Filed Nov. 9, 1925
2 Sheets-Sheet 1
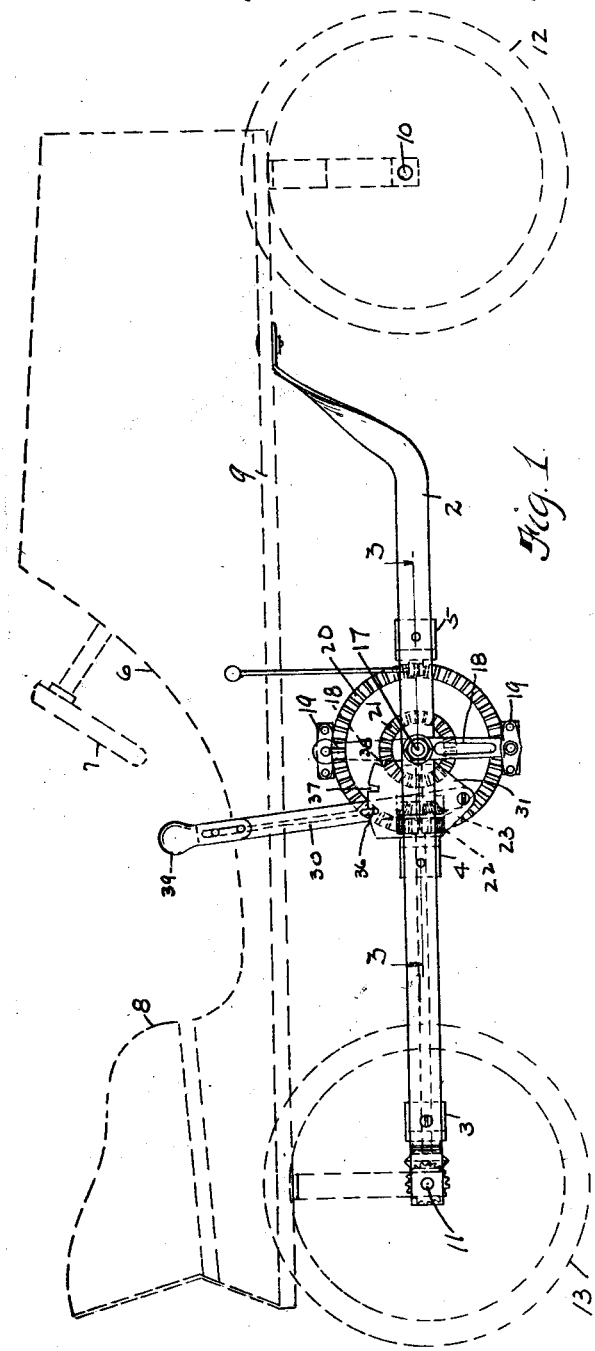
INVENTOR.
Benjamin F. Colvin
BY
Fay, Oberlin + Fay
ATTORNEYS Sept. 4, 1928.

B. F. COLVIN 1,683,240

CHILD'S VEHICLE

Filed Nov. 9, 1925      2 Sheets-Sheet 2

INVENTOR.
Benjamin F. Colvin
BY
Fay, Oberlin & Fay
ATTORNEYS

Patented Sept. 4, 1928.

1,683,240

UNITED STATES PATENT OFFICE.

BENJAMIN F. COLVIN, OF FREMONT, OHIO.

CHILD'S VEHICLE.

Application filed November 9, 1925. Serial No. 67,763.

The present invention, relating, as indicated, to children's vehicles is more particularly directed to the provision of an improved self-driven vehicle for children which shall be capable of being driven at different speeds, and in which simple and effective means are provided for accomplishing a two-speed drive from between the propelling means, such as the pedals and the wheels. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 3:
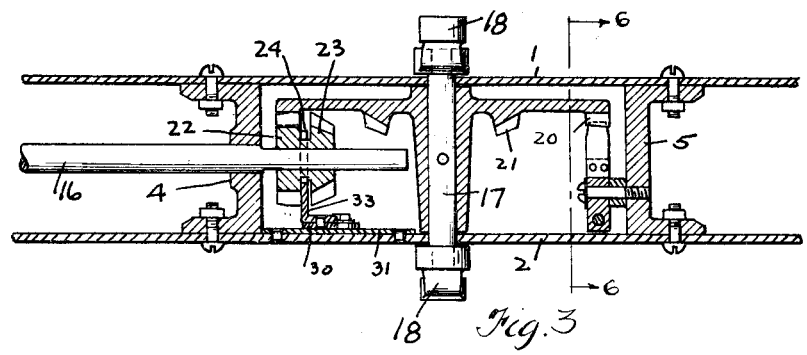
Figure 4:
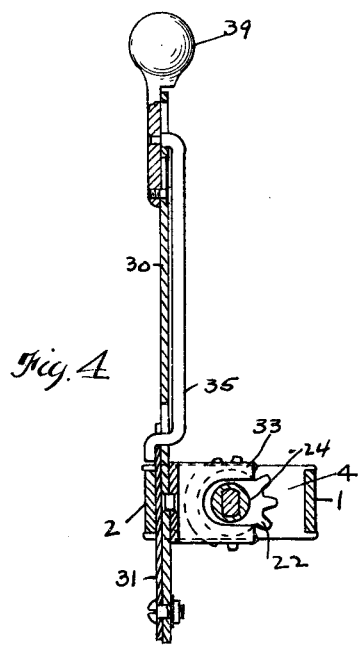
Figure 5:
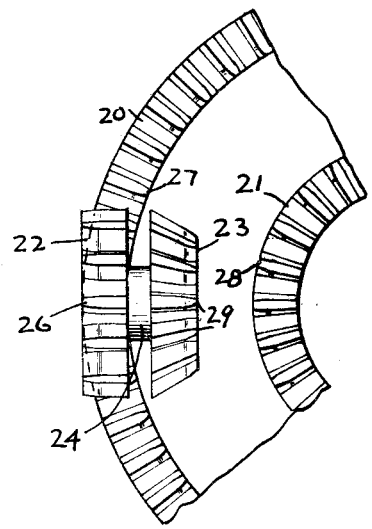
Figure 6:
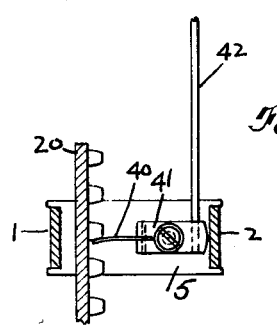

Fig. 1 is a side elevation showing my invention in connection with one type of vehicle body; Fig. 2 is a plan view of the driving means; Fig. 3 is a horizontal section through the gearing effecting the two-speed drive; Fig. 4 is a transverse section of the gear shifting lever and gears; Fig. 5 is a partial side elevation of the driving gearing; and Fig. 6 is a plan view showing a detail of construction.

All children are of course interested in small vehicles which they can propel themselves at a high rate of speed, but if the propelling mechanism be constructed to give a high speed it is of course exceedingly difficult for a child to maneuver the vehicle over rough or inclining surfaces, and it is therefore usually the practice to effect a compromise which materially lowers the speed of the vehicle. I am aware that it has been suggested to employ two-speed drives for such vehicles, but no such vehicles have ever been successful in practice and none are today in common use, principally because of the difficulty of securing a design of gearing which will be readily shiftable from one drive to the other and which can be manufactured at a cost allowing it to be used in vehicles which will sell for the prices of children's vehicles. I have designed driving mechanism for effecting a two-speed drive which are both extremely simple and inexpensive to manufacture, and in which the change from one speed to the other may be effected at any time even during the operation and forward movement of the vehicle.

Referring now to Figs. 1 and 2, there is shown a frame consisting of parallel bars 1 and 2 rigidly secured together by transverse braces or brackets 3, 4 and 5. On this frame may be mounted any suitable type of body, and I have here illustrated an automobile type of body 6, having a steering wheel 7 and seat 8, although it will be understood that other types of bodies suitable for children's vehicles may equally well be employed in place of the one here represented.

Secured to the base 9 of the body 6 are axles 10 and 11 supported on wheels 12 and 13, respectively, and the operation of the vehicle is effected by driving the rear axle 11 through bevel gears 14 and 15, of which the gear 14 is secured to the shaft 11, and the gear 15 is secured to the shaft 16. The shaft 16 extends longitudinally of the vehicle and is disposed centrally between the frame members 1 and 2, being suitably journaled in brackets 3 and 4. Mounted centrally of the frame members 1 and 2 is a transverse shaft 17 carrying cranks 18, on which are secured pedals 19. The pedals are connected to operate the shaft 16 through two-speed gearing, the construction and operation of which will now be described.

My improved driving gearing consists of concentrically arranged spaced gears 20 and 21, which are desirably formed integral with each other and secured as a unit to the shaft 17. Slidably, but non-rotatably, secured on the forward end of the shaft 16 are gears 22 and 23 which are connected by a collar or sleeve 24, and which are adapted to engage with the gears 20 and 21 when moved along the shaft 16 to the proper position. The gears 22 and 23 are also preferably formed together, and may conveniently be made of fiber, bakelite or similar material.

The two gears 20 and 21 are bevel gears which are inclined toward each other, the gear 21 being a true bevel gear, while the gear 20 is almost a spur gear. Of the gears 22 and 23, the gear 23 is a bevel gear while the gear 22 is substantially a spur gear, but is provided with tapered ends 26 on its teeth, which are well adapted to slide in between, and to enter into engagement with, correspondingly tapered inner ends 27 on the teeth of the gear 20. Similarly, the outer ends of the teeth of the gear 21 and the inner ends of the teeth of the gear 23 are beveled as at 28 and 29, respectively, to facilitate convenient engagement of these two gears during the operation of the vehicle, that is, without bringing the vehicle to a stop in order to stop rotation of the gears to be engaged.

A shifting lever is provided for sliding the gears 22 and 23 on the shaft 16, this lever 30 being pivotally mounted at its lower end on a bracket 31 secured to the frame member 2 and having a forked arm 33 which engages over the sleeve 24 connecting the two gears 22 and 23. The lever is held in any desired position to maintain the various gears in mesh by means of a gravity actuated pawl 35, which engages in notches 36, 37 or 38 on the bottom edge of the bracket 31, these various positions corresponding to the low gear in neutral and high gear positions of the driving mechanism. The pawl 35 may be lifted out of which ever notch it may be engaged in by raising the ball end 39 which is secured to it, and the weight of the pawl and ball will re-engage the lower end of the pawl when it is next brought in registration with one of the three notches in the bracket 31.

A spring 40, adapted to be interposed in the path of movement of the outer gear 20, that is, in a position where it will engage successively with the various teeth on this gear, is secured to a pivotally mounted block 41 which is swung by means of a rod or wire 42 to bring it either out of engagement with the gear or into the position shown in Fig. 6, in which position it will be engaged by the teeth of the gear and will make a clicking noise which may be used as a signal of the approach of the vehicle.

I have found that the present driving mechanism is entirely satisfactory for securing a two-speed operation of a vehicle of this character. The gears may be easily and quietly engaged during the operation of the vehicle by reason of the formation of these gears, while their construction is extremely simple, the two driven gears being formed preferably integral to each other and the two driving gears being formed also integral to each other and of material which is practically noiseless when in driving engagement with the metal driven gears. Furthermore, the entire construction of the driving mechanism and the shifting means are simple and economical to manufacture.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a child's vehicle, the combination of a frame, wheels supporting the same, a shaft connected to drive certain of said wheels, a pedal shaft, freely engageable gearing comprising drive gears on said pedal shaft and driven gears slidably connected on said first-named shaft, the teeth of said gears having tapered and sloping lead-in portions, and means for selectively sliding the driven gears into engagement with the drive gears.

2. In a child's vehicle, the combination of a frame, wheels supporting the same, a shaft connected to drive certain of said wheels, a pedal shaft, freely engageable gearing comprising drive gears on said pedal shaft and driven gears slidably carried on said first-named shaft, the teeth of said gears having tapered and sloping lead-in portions, a shifting lever for selectively sliding the driven gears into engagement with the drive gears, and a weight-controlled pawl for locking said lever.

3. In a child's vehicle, the combination of a frame, wheels supporting the same, a shaft connected to drive certain of said wheels, a pedal shaft, a double gear mounted on said pedal shaft and having an inner bevel gear and an outer bevel gear said last named gear having its inclined surfaces of less angle than the surfaces of said first bevel gear, a driving shaft connected to said wheel shaft, a double pinion slidably mounted on said driving shaft and movable into engagement with said double gear, said gear and pinion both having tapered lead in surfaces for securing direct driving engagement irrespective of differences in speed, and hand operated weight controlled means for locking said pinion gear in selected position.

Signed by me, this 25th day of September, 1925.

BENJAMIN F. COLVIN.